(12) United States Patent
Schaefer (10) Patent No.: US 9,468,976 B2
(45) Date of Patent: Oct. 18, 2016

(54) HOLDER FOR A CUTTING DEVICE (71) Applicant: HARTMETALL-WERKZEUGFABRIK PAUL HORN GMBH, Tuebingen (DE)

(72) Inventor: Hans Schaefer, Gomaringen (DE)

(73) Assignee: HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 333 days.

(21) Appl. No.: 14/104,272

(22) Filed: Dec. 12, 2013

(65) Prior Publication Data

US 2014/0099168 A1    Apr. 10, 2014

Related U.S. Application Data (63) Continuation of application No. PCT/EP2012/061236, filed on Jun. 13, 2012.

(30) Foreign Application Priority Data

Jun. 14, 2011 (DE) .................... 20 2011 101 852 U (51) Int. Cl.
| | |
|---|---|
| *B23B 27/10* | (2006.01) |
| *B23B 29/04* | (2006.01) |
| *B23B 29/14* | (2006.01) |

(52) U.S. Cl.
CPC ............. *B23B 27/10* (2013.01); *B23B 29/043* (2013.01); *B23B 29/14* (2013.01); *B23B 2205/02* (2013.01); *B23B 2250/12* (2013.01); *Y10T 407/14* (2015.01)

(58) Field of Classification Search
CPC ..... B23B 27/10; B23B 29/14; B23B 29/043; B23B 2205/02; B23B 2250/12; Y10T 407/225; Y10T 407/2286
See application file for complete search history.

(56) References Cited

U.S. PATENT DOCUMENTS

| | | |
|---|---|---|
| 3,795,454 A | 3/1974 | Elchyshyn |
| 4,131,383 A | 12/1978 | Powers |

(Continued)

FOREIGN PATENT DOCUMENTS

| | | |
|---|---|---|
| CN | 101541454 A | 9/2009 |
| CN | 101541455 A | 9/2009 |

(Continued)

OTHER PUBLICATIONS

Office Action issued in corresponding Japanese Application No. 2014-515181, dated Mar. 12, 2015, wherein JP 2010-510896, JP 2010-510897, JP Hei 07-227702 A, US 2009/0285645 A1, and US 2010/0061814 A1.

(Continued)

*Primary Examiner* — Sunil K Singh
*Assistant Examiner* — Alan Snyder
(74) *Attorney, Agent, or Firm* — Saliwanchik, Lloyd & Eisenschenk (57) ABSTRACT

A cutting device comprising a cutting insert and a holding part with a beam part, extending in a longitudinal direction, and a clamping head, which projects beyond an upper side of the holding part with a projection, wherein the projection is connected to a first of two clamping fingers which between them form a receiving pocket for receiving the cutting insert. A clamping gap is provided underneath the projection to allow the first clamping finger to be elastically movable. The clamping gap opens out into the receiving pocket and runs from an end face of the holding part that is facing the workpiece to be worked in the longitudinal direction up to the rear end of said holding part, which rear end is arranged in the transitional region between the clamping head and the beam part. A coolant and/or lubricant guide is provided for feeding coolant and/or lubricant to a coolant and/or lubricant outlet arranged in the projection. The projection extends with a continuing portion in the longitudinal direction beyond the rear end of the clamping gap and the coolant and/or lubricant guide runs through the continuing portion.

20 Claims, 7 Drawing Sheets

(56) References Cited

U.S. PATENT DOCUMENTS

| | | | |
|---|---|---|---|
| 4,778,315 A | 10/1988 | Duffy et al. | |
| 5,709,508 A * | 1/1998 | Barazani | B23B 27/045 407/101 |
| 5,904,455 A | 5/1999 | Krenzer et al. | |
| 6,045,300 A | 4/2000 | Antoun | |
| 6,139,227 A | 10/2000 | Schafer et al. | |
| 6,514,019 B1 | 2/2003 | Schulz | |
| 2008/0131215 A1* | 6/2008 | Sjoo | B23B 27/04 407/110 |
| 2009/0285645 A1 | 11/2009 | Hecht | |
| 2010/0061814 A1 | 3/2010 | Hecht | |
| 2011/0058908 A1 | 3/2011 | Schaefer | |

FOREIGN PATENT DOCUMENTS

| | | |
|---|---|---|
| DE | 27 33 705 | 2/1978 |
| DE | 44 35 857 | 4/1996 |
| DE | 198 34 635 | 2/2000 |
| DE | 103 46 726 | 5/2005 |
| EP | 0 937 526 A | 8/1999 |
| EP | 1 080 811 | 3/2001 |
| JP | Hei 07-227702 | 8/1995 |
| JP | 2010-510896 | 4/2010 |
| JP | 2010-510897 | 4/2010 |
| WO | WO 97/17154 | 5/1997 |
| WO | WO-2008-066473 | 6/2008 |
| WO | WO-2008-066474 | 6/2008 |
| WO | WO-2009-135592 | 11/2009 |

OTHER PUBLICATIONS

Office Action issued in corresponding Chinese Application No. 201280029634.9, dated Apr. 1, 2015, wherein CN 101541454 A, CN 101541455 A, EP 0 937 526 A, WO 97/17154, and US 2011/0058908 A1.

English translation of Office Action issued in corresponding Japanese Application No. 2014-515181, dated Mar. 12, 2015, wherein JP 2010-510896, JP 2010-510897, JP Hei 07-227702 A, US 2009/0285645 A1, and US 2010/0061814.

\* cited by examiner

HOLDER FOR A CUTTING DEVICE

CROSS-REFERENCE TO RELATED APPLICATIONS

This application is a continuation of international patent application PCT/EP2012/061236, filed on Jun. 13, 2012 designating the U.S., which international patent application has been published in German language and claims priority from German patent application DE 20 2011 101 852.4, filed on Jun. 14, 2011. The entire contents of these priority applications are incorporated herein by reference.

BACKGROUND OF THE INVENTION

This disclosure relates to a cutting tool having a cutting insert and a holder. The disclosure also relates to a holder for such a cutting tool.

WO 2009/135592 A1 discloses a cutting tool which has a holder with an elongated beam part. A clamping head which is arranged on a front region of the beam part projects above the level of a top surface of the beam part by way of a projection. A top finger, which, with a bottom finger, forms a receiving pocket for receiving a cutting insert, is arranged on a longitudinal side of the beam part. A clamping gap, which enables a resilient pivoting movement of the top finger, opens out into the receiving pocket. By tightening a clamping screw which interacts with an internal thread, the top finger is acted upon with a clamping force which is directed downward toward the bottom finger, under the influence of which the cutting insert is clamped fixedly in the receiving pocket between the fingers. In the case of the known solutions, all paths which lead from the beam part into the projection are interrupted by the clamping gap. This means in other words that up to now no path has lead past the clamping gap. Consequently, a coolant is directed into the processing region in which the cutting insert is in processing contact with the workpiece from the outside via an external coolant supplying means.

The coolant jet has to be set in a precise manner such that the corresponding nozzles always have to be re-adjusted for different components. Further disadvantages of said known solution are that tool change operations are made more difficult and the external supply lines can be easily damaged. In addition, the external coolant supplying means requires a large amount of time and money to be spent on equipment.

SUMMARY OF THE INVENTION

It is thus an object to provide a non-problematic coolant and/or lubricant supplying means to an operating region with a minimum amount of time and money spent on equipment and construction.

In view of this object, a holder for a cutting tool having a cutting insert is provided. The holder comprises (i) a beam part which extends in a longitudinal direction and (ii) a clamping head having a first and a second clamping finger which together form a receiving pocket for receiving the cutting insert. The clamping head projects above a top surface of the beam part by way of a projection. The projection is connected to the first clamping finger. A clamping gap is provided below the projection to enable the first clamping finger to be elastically movable. The clamping gap opens out into the receiving pocket and extends in the longitudinal direction from an end face of the holder facing a workpiece to be processed as far as up to a rear end of the clamping gap. The rear end of the clamping gap is arranged in a transition region between the clamping head and the beam part. The projection extends in the longitudinal direction beyond the rear end of the clamping gap by way of a continuation portion. The first and the second clamping fingers are arranged on a first longitudinal side of the holder and the continuation portion is arranged on a second longitudinal side of the holder, wherein the second longitudinal side is opposite the first longitudinal side. Furthermore, the holder comprises a coolant guiding channel that extends within the holder for supplying coolant and/or lubricant to a coolant outlet arranged in the projection. The coolant guiding channel comprises a rectilinear through passage, a cross passage and an end passage. The through passage is inclined by an angle in relation to the longitudinal direction and extends from the beam part through the continuation portion into the projection. The cross passage extends transversely with respect to the longitudinal direction and connects the through passage with the end passage. The end passage opens into the coolant outlet.

In a further aspect, a cutting device comprising the above-mentioned holder and a cutting insert is presented.

The disclosure shows a way how a coolant and/or lubricant guiding channel is able to pass from the beam part into the projection past the clamping gap and consequently for the first time creates the prerequisites in the case of a clamping holder for the coolant and/or lubricant guiding channel to be able to be completely incorporated into the holder as far as up to an outlet in the end-face of the holder. The coolant and/or lubricant can then be guided through the holder via corresponding guiding paths (herein also denoted as passages) directly up to the processing region where it is actually required. The cutting tool according to the present disclosure realizes in a simple manner a coolant and/or lubricant supply to the operating region. In only one operating step, both the tool itself can be mounted or dismounted and the coolant and/or lubricant supply for the tool can be installed or isolated. The term "operating region", in this case, is to be understood as the region in which the cutting insert is in processing contact with a workpiece.

The clamping fingers of the holder are preferably arranged on one of the longitudinal sides of the holder, whilst the continuation portion is arranged on the opposite longitudinal side of the holder. As a result of said bearing arrangement of the continuation portion being removed far from the clamping fingers, the elastic pivoting movement is maintained for the top clamping finger (herein also denoted as "first clamping finger").

According to a refinement, a width of the beam part is a multiple of the thickness of the continuation portion. This means in other words that the continuation portion is very narrow and consequently only has a slight influence on the inherent elasticity of the material parts of the clamping head.

According to a further refinement, the coolant and/or lubricant outlet opens out into the air on a front face of the top finger which extends transversely with respect to the longitudinal direction. In this way, the coolant and/or lubricant jet, prior to hitting its target, receives a component in the direction of gravity such that, as a result of gravity and with the support of the coolant and/or lubricant jet, the swarf generated during processing is in turn picked up and entrained by the latter.

For example, the continuation portion is realized in a web-like manner. A web is to be understood, in this case, as a flat element which is longer than it is wide. A web is simple to produce.

According to a further refinement, the continuation portion consists of the same material as the holder. In particular, the continuation portion is realized integrally with the holder. The advantage of this is that separate production of the continuation portion is not required. In addition, the mounting step for fastening the continuation portion on the holder is made superfluous as result of incorporating the continuation portion in the holder.

According to a further refinement, a rectilinear through passage of a coolant and/or lubricant guiding channel, said through passage being inclined by an angle in relation to the longitudinal direction, extends from the beam part via the continuation portion into the projection. A rectilinear through passage can be produced simply, for example, by means of drilling and provides a short, direct path from the beam part into the projection.

According to a further refinement, the through passage is guided past the rear end of the clamping gap close to said rear end. The distance between the clamping gap and the through passage is consequently very small and both lie closely adjacent one another such that a narrow type of construction requiring a small amount of installation space is achieved.

DESCRIPTION OF PREFERRED EMBODIMENTS

Identical or equivalent components or parts in FIGS. 1 to 11 are provided with identical references.

Figure 1:
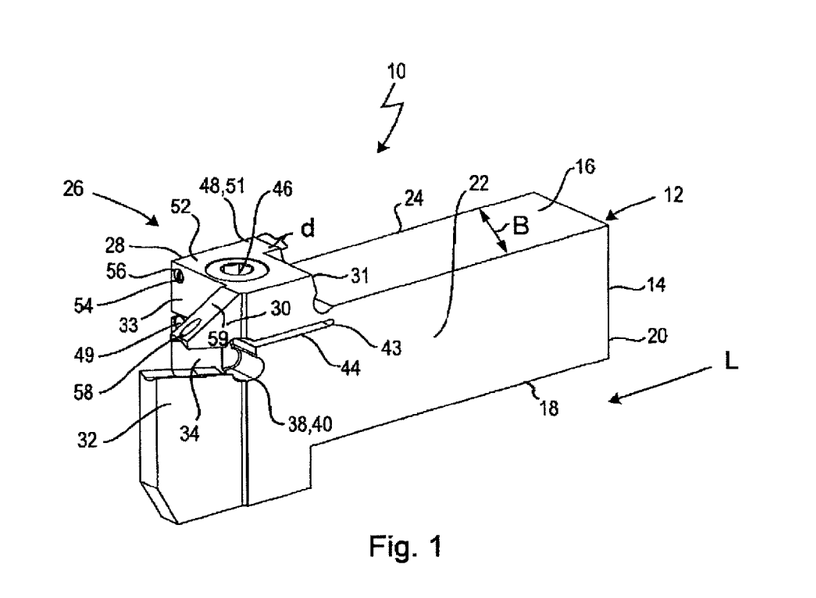
FIG. 1 shows a perspective representation of a cutting tool according to an embodiment.

FIG. 1 illustrates a cutting tool 10 according to an embodiment with a holder 12. The holder 12 has a beam part 14 which extends in a longitudinal direction L and is defined at the top by a planar top surface 16 and at the bottom by a bottom surface 18 which is arranged parallel with respect to the top surface 16 and points downward in a position of use. The beam part 14 is defined at the rear by a rectangular, even rear surface 20.

The holder 12 also has a right-hand longitudinal side 24 and a left-hand longitudinal side 22 which is arranged at a spacing parallel to the said right-hand longitudinal side. A clamping head 26, which is arranged on the front region of the beam part 14, projects by way of a block-like solid projection 28 above the level of the top surface 16.

A top finger 30, which is in the form of a flat, triangular prism and is arranged on the left-hand longitudinal side 22, juts out from the front end face 33 of the projection 28 which extends transversely with respect to the longitudinal direction L and faces the workpiece to be processed (not shown).

A bottom finger 32 is located opposite the top finger 30. The workpiece is, for example, a rotating workpiece (rotary part).

Figure 7:
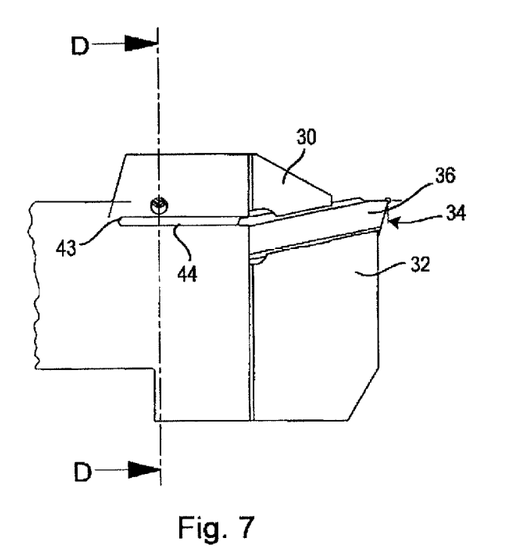
FIG. 7 shows a side view of a front region of the cutting tool with a cutting insert.

The top finger 30 and the bottom finger 32 form between them a receiving pocket 36 for receiving the cutting insert 36 which is shown in FIG. 7. An acute end of the cutting insert 36 projects in the mounted state into a tip receiving means 38 which is defined at the rear by a cylindrical inner wall 40. A clamping gap 44, which extends in the longitudinal direction L as far as up to a rear end 42, opens out into the receiving pocket 34. The clamping gap 44 enables a resilient pivoting movement of the top finger 30 in a plane which is arranged parallel to the longitudinal sides 22, 24 of the beam part 14 about a geometric axis which extends through the beam part 14 transversely with respect to the longitudinal direction L approximately in the region of the rear end 43 of the clamping gap 44. By tightening a clamping screw 46 which interacts with an internal thread, the top finger 30 is acted upon with a clamping force which is directed downward toward the bottom finger 32, under the influence of which the cutting insert 36 is clamped fixedly in the receiving pocket 34 between the fingers 30, 32. By unscrewing the clamping screw 46, the top finger 30 is moved under the influence of its inherent elasticity in the direction of its position of rest (the position which the top finger 30 assumes without any influence from an external force), as a result of which the receiving pocket 34 gapes open somewhat and the cutting insert 36 is released for replacement. In other words, the clamping force by way of which the cutting insert 36 is clamped in the receiving pocket 34 is able to be eliminated by unscrewing the clamping screw 46. The clamping head 26 is partly penetrated by a counter bearing in the form of a pin 49. If the clamping screw 46 is tightened when the cutting insert 36 is being fixed, the top wall face of the clamping gap 44 can be supported against the counter bearing.

A continuation portion 48, which, in this case, is realized as a web 48, juts out from a rear end face 31 of the projection 28 which points rearward and is located opposite the front end face 30 of the projection 28. The web 48 is arranged on the right-hand longitudinal side of the holder 12. The thickness d of the web 48, defined as the extension of the web 48 in the lateral direction extending transversely with respect to the longitudinal direction L, is small with reference to the width B of the beam part 14. For example, the width B (defined as the distance between the longitudinal sides 22, 24) of the beam part 14 is a multiple of the thickness d of the web 48. As a result of the web 48, it is possible to bypass the restricting clamping gap 44 and the coolant guiding channel is then able to pass from the beam part 14 into the projection 28 via the web 48. The web 48 consequently provides a solution to the afore-described problem of the clamping gap 44 which was standing in the way.

The top surface 51 of the web 50 which points upward closes off in a flush manner with the top surface 52 of the projection 28.

The web 48, which is realized integrally with the holder 12, extends—when viewed projected in a plane parallel to the top surface 16 or bottom surface 18 of the beam part 14—in the longitudinal direction L from the rear end face 31 of the projection 28 beyond the rear end 43 of the clamping gap 44.

A superfluous outlet opening 54, which opens to the outside on the front surface 33 of the projection 28 and in which a through passage 62 (described in more detail below) of a coolant guiding channel ends, is tightly sealed by way of a plug 56.

All the lines of the coolant guiding channel are admitted into the solid holder 12 as bores, superfluous openings being sealed in each case by a plug 56.

An outlet opening 58 opens out into space on the front face 59 of the top finger 30 which is arranged inclinedly with respect to the longitudinal direction L. An end passage 64 of the coolant guiding channel which is described in more detail below ends in the outlet opening 58. In operation, a coolant and/or lubricant jet (not shown) which is directed onto the operating region exits out of the outlet opening 58.

Figure 2:
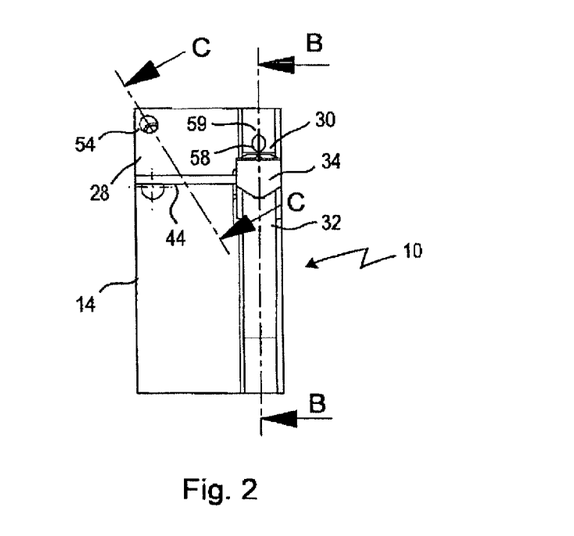
FIG. 2 shows a front view of the cutting tool according to an embodiment.

FIG. 2 shows a front view of the cutting tool 10. The clamping gap 44 penetrates the beam part 14 completely over the entire width B thereof. The inside width of the receiving pocket 34 is defined by the distance between the two fingers 30, 32 from one another. The outlet opening 58 is situated in the region of the bottom edge of the front face 59 of the top finger 30.

The outlet opening 54 is situated in a top right-hand corner region of the projection 28.

Figure 3:
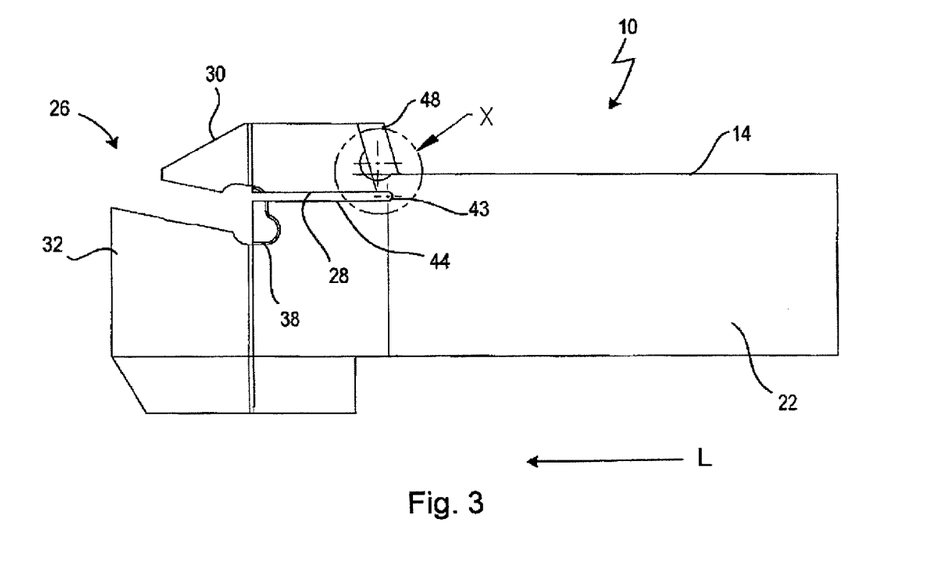
FIG. 3 shows a side view of the cutting tool according to an embodiment.

FIG. 3 shows a side view of the cutting tool 10. The top finger 30 and the bottom finger 32 extend on the left-hand longitudinal side 22 of the cutting tool 10 in the longitudinal direction L in each case parallel to the left-hand longitudinal side 22, whilst the web 48 is arranged on the opposite right-hand longitudinal side 24 of the beam part 14.

Figure 4:
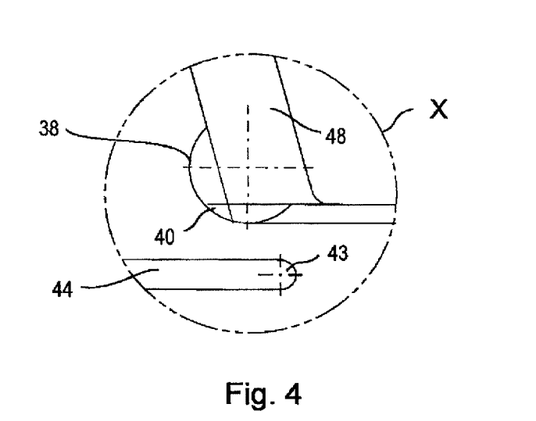
FIG. 4 shows the enlarged detail X from FIG. 3.

FIG. 4 shows the enlarged detail X from FIG. 3. On the left-hand longitudinal side 22 of the beam part 14 a spacing is necessary between the inner wall 40 of the tip receiving means 38 and the clamping gap 44 so that the structure of the beam part 14 in said region is not weakened too much as a result of the recesses lying too closely next to one another. This means by implication that a coolant guiding channel which is theoretically to extend through the region between the inner wall 40 and the clamping gap 44 would have to have such a small diameter that the cross-sectional flow would be too small to achieve a sufficient coolant flow rate.

Figure 5:
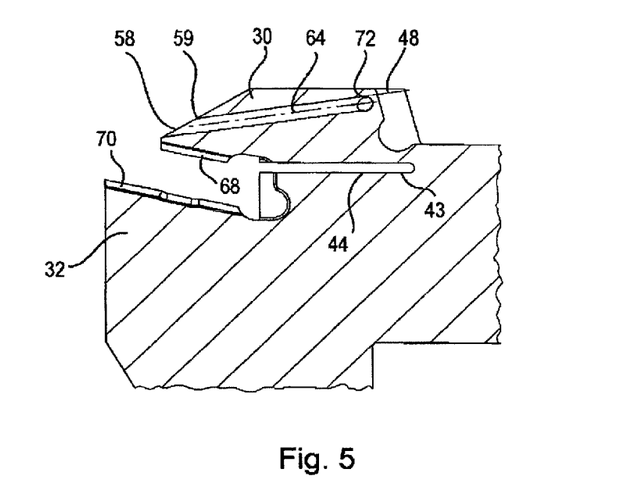
FIG. 5 shows a section along the line B-B from FIG. 2.

FIG. 5 shows a section along the line B-B from FIG. 2. The web 48 has a rectangular cross section. The end passage 64 of the coolant guiding channel which ends in the outlet opening 58 extends rearward from the front face 59 of the top finger 30 with an upward tendency and opens by way of the rear end thereof into a upper cross passage 72 of the coolant guiding channel.

The top finger 30 has a top guiding edge 68, whilst the bottom finger 32 has a bottom guiding edge 70. The two guiding edges 68, 70 form a linear guide for the cutting insert 36 in each case with a corresponding groove which is provided on the cutting insert 36 and in which the guiding edges 68, 70 engage.

Figure 6:
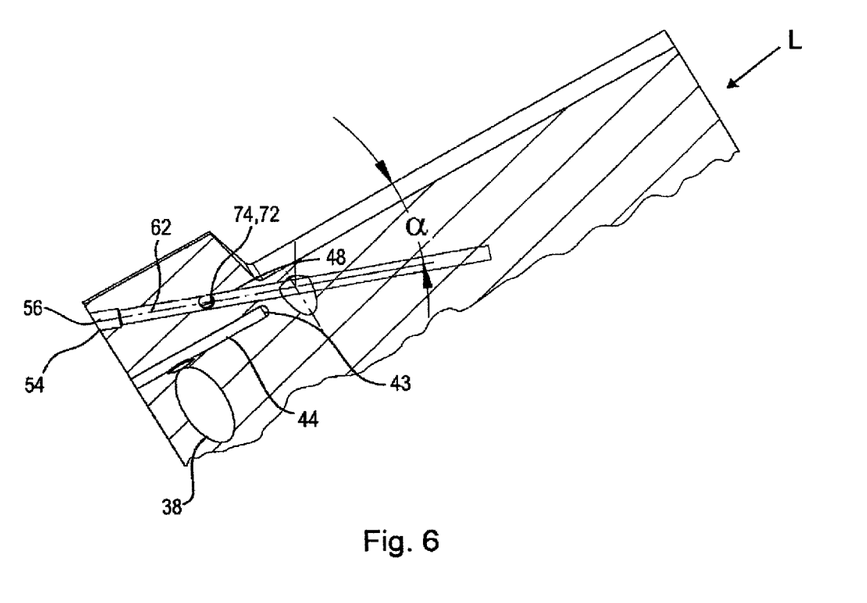
FIG. 6 shows a section along the line C-C from FIG. 2.

FIG. 6 shows a section along the line C-C from FIG. 2. The through passage 62 of the coolant guiding channel, which is sealed by way of the plug 56 and ends in the outlet opening 54, extends through the web 48 inclinedly at an angle α with reference to the longitudinal direction L. The angle α is for example 20°. The upper cross passage 72 of the coolant guiding channel, which extends transversely with respect to the longitudinal direction L, opens into the through passage 62 at a right angle in the mouth 74.

The geometric dimensions of the web, of the clamping gap 44 and of the through passage 62 are chosen such that a minimum spacing is maintained between the clamping gap 44 and the through passage 62 such that the beam part 14 has sufficient structural strength in said region.

FIG. 7 shows a side view of the front region of the cutting tool 10 with a cutting insert 36 inserted. The cutting insert 36 is clamped fixedly between the two fingers 30, 32 by means of the above-described clamping mechanism.

Figure 8:
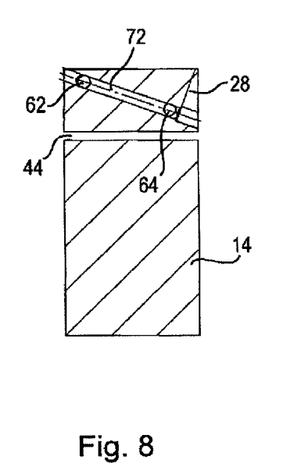
FIG. 8 shows a section along the line D-D from FIG. 7.

FIG. 8 shows a section along the line D-D from FIG. 7. The end passage 64 of the coolant guiding channel on the one hand and the through passage 62 of the coolant guiding channel on the other hand open, in each case at a right angle, into the upper cross passage 72 of the coolant guiding channel, which extends from a top right-hand corner region of the projection 28 into a bottom left-hand corner region of the projection 28.

Figure 9:
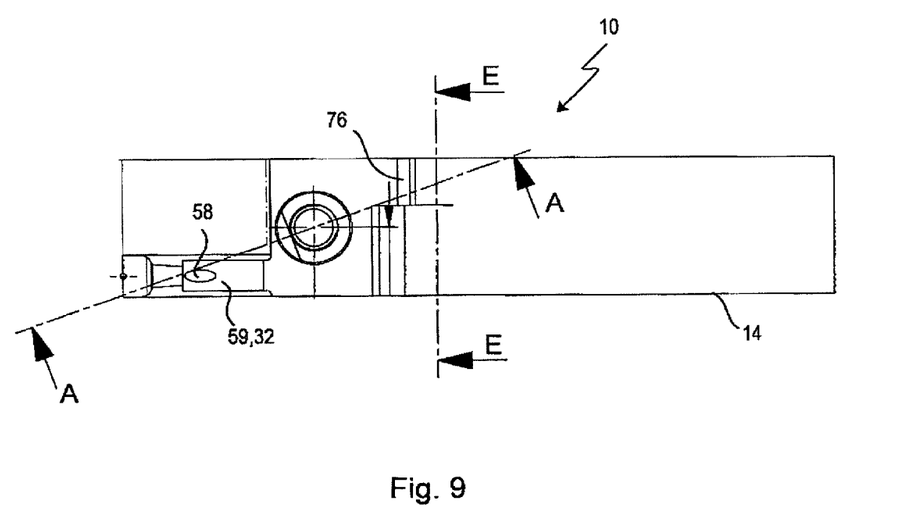
FIG. 9 shows a section in the longitudinal direction through the cutting tool.

FIG. 9 shows a section in the longitudinal direction L through the cutting tool 10. The clamping screw 46 and the outlet opening 58 on the front face 59 of the top finger 32 can clearly be seen.

Figure 11:
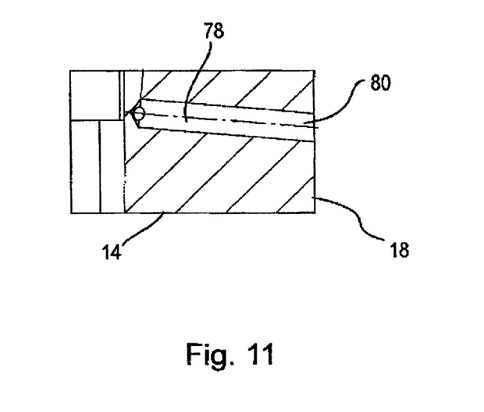
FIG. 11 shows a section along the line E-E from FIG. 9.

A lower cross passage 76 of the coolant guiding channel, which extends transversely with respect to the longitudinal direction L, connects the through passage 62 to the initial passage 78 of the coolant guiding channel which can be seen in FIG. 11.

Figure 10:
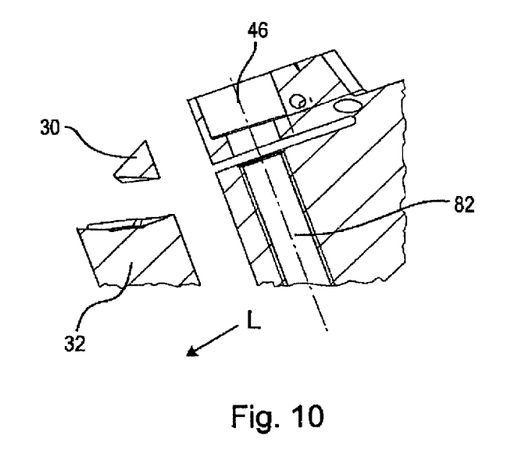
FIG. 10 shows a section along the line A-A from FIG. 9.

FIG. 10 shows a section along the line A-A from FIG. 9. The receiving pocket formed between the top finger 30 and the bottom finger 32 opens into the clamping gap 44. The thread shaft 82 of the clamping screw 64 extends at a right angle with respect to the longitudinal direction L.

FIG. 11 shows a section along the line E-E from FIG. 9. The initial passage 78 ends in an inlet opening 80 which opens to the outside on the bottom surface 18 of the beam part 14 and can be connected to a coolant source (not shown).

In summary, the disclosure provides a possibility of how a coolant and/or lubricant guiding channel is able to be incorporated into the holder 12. The coolant guiding channel comprises separate channel parts or portions which are herein denoted as: initial passage/portion 78, through passage/portion 62, upper and lower cross passage/portion 72, 76, and end passage/portion 64. It is obvious that the present disclosure is able to be modified in diverse ways without departing from the inventive concept. Thus, for example, the geometric development of the coolant guiding channel inside the holder 12 can be shaped in a different manner. The continuation portion 48 can be in a form other than the web form. In addition, it is possible for the continuation portion 48 to extend, for example, over a large part of the width B of the beam part 14 or over the entire width B.

What is claimed is:

1. A holder for a cutting tool having a cutting insert, wherein the holder comprises:
    a beam part which extends in a longitudinal direction from a rear surface of the beam part to a front region of the beam part, and extends in a first transverse direction from a bottom surface of the beam part to a top surface of the beam part,
    wherein the first transverse direction is perpendicular to the longitudinal direction; and
    a clamping head having a first and a second clamping finger which together form a receiving pocket for receiving the cutting insert,
    wherein the clamping head is arranged on the front region of the beam part,
    wherein the clamping head projects above a top surface of the beam part in the first transverse direction by way of a projection,
    wherein the projection is connected to the first clamping finger, wherein below the projection in a direction opposite to the first transverse direction a clamping gap is provided to enable the first clamping finger to be elastically movable, wherein the clamping gap opens out into the receiving pocket and extends in a direction opposite to the longitudinal direction from an end face of the holder facing a workpiece to be processed as far as up to a rear end of the clamping gap, wherein the rear end of the clamping gap is arranged in a transition region between the clamping head and the beam part, wherein the projection extends in the direction opposite to the longitudinal direction beyond the rear end of the clamping gap by way of a continuation portion, wherein the first and the second clamping fingers are arranged on a first longitudinal side of the holder and the continuation portion is arranged on a second longitudinal side of the holder, wherein the second longitudinal side and the first longitudinal side both extend parallel to the longitudinal direction and parallel to the first transverse direction, wherein the second longitudinal side is spaced from the first longitudinal side in a second transverse direction, wherein the second transverse direction is perpendicular to the longitudinal direction, wherein a coolant guiding channel extends within the holder for supplying coolant and/or lubricant to a coolant outlet arranged in the projection, wherein the coolant guiding channel comprises:
   a rectilinear through passage,
   a cross passage; and
   an end passage, wherein the through passage is inclined by an angle in relation to the longitudinal direction and extends from the beam part through the continuation portion into the projection, wherein the cross passage extends transversely with respect to the longitudinal direction and connects the through passage with the end passage, and wherein the end passage opens into the coolant outlet.

2. The holder as claimed in claim 1,
wherein the cross passage of the coolant guiding channel is arranged perpendicularly to the through passage and the end passage of the coolant guiding channel.

3. The holder as claimed in claim 1,
wherein the cross passage of the coolant guiding channel has a first and a second end,
wherein the first end opens into the through passage at a right angle, and
wherein the second end opens into the end passage at a right angle.

4. The holder as claimed in claim 1,
wherein at least a part of the end passage is arranged within the first clamping finger, and
wherein at least a part of the through passage is arranged within continuation portion.

5. The holder as claimed in claim 1,
wherein the beam part has a width measured perpendicularly to the longitudinal direction,
wherein and the continuation portion has a thickness measured perpendicularly to the longitudinal direction, and
wherein the width of the beam part is larger than the thickness of the continuation portion.

6. The holder as claimed in claim 1,
wherein the coolant outlet is arranged on a front face of the first clamping finger, and
wherein the front face extends transversely with respect to the longitudinal direction.

7. The holder as claimed in claim 1,
wherein the continuation portion comprises a web being a flat element which is longer than it is wide.

8. The holder as claimed in claim 1,
wherein the continuation portion consists of the same materials as the beam part of the holder.

9. The holder as claimed in claim 1,
wherein the continuation portion is formed integrally with the beam part of the holder.

10. The holder as claimed in claim 1,
wherein the through passage is guided past the rear end of the clamping gap close to the rear end of the clamping gap.

11. A cutting tool comprising:
a cutting insert; and
a holder with
   (i) a beam part which extends in a longitudinal direction from a rear surface of the beam part to a front region of the beam part, and extends in a first transverse direction from a bottom surface of the beam part to a top surface of the beam part,
   wherein the first transverse direction is perpendicular to the longitudinal direction; and
   (ii) a clamping head having a first and a second clamping finger which together form a receiving pocket for receiving the cutting insert, wherein the clamping head is arranged on the front region of the beam part, wherein the clamping head projects above a top surface of the beam part in the first transverse direction by way of a projection, wherein the projection is connected to the first clamping finger;

wherein below the projection in a direction opposite to the first transverse direction a clamping gap is provided to enable the first clamping finger to be elastically movable, wherein the clamping gap opens out into the receiving pocket and extends a direction opposite to in the longitudinal direction from an end face of the holder facing a workpiece to be processed as far as up to a rear end of the clamping gap, wherein the rear end of the clamping gap is arranged in a transition region between the clamping head and the beam part, wherein the projection extends in the direction opposite to the longitudinal direction beyond the rear end of the clamping gap by way of a continuation portion, wherein the first and the second clamping fingers are arranged on a first longitudinal side of the holder and the continuation portion is arranged on a second longitudinal side of the holder, wherein the second longitudinal side and the first longitudinal side both extend parallel to the longitudinal direction and parallel to the first transverse direction, wherein the second longitudinal side is spaced from the first longitudinal side in a second transverse direction, wherein the second transverse direction is perpendicular to the longitudinal direction, wherein a coolant guiding channel extends within the holder for supplying coolant and/or lubricant to a coolant outlet arranged in the projection,
wherein the coolant guiding channel comprises:
a rectilinear through passage,
a cross passage, and
an end passage,
wherein the through passage is inclined by an angle in relation to the longitudinal direction and extends from the beam part through the continuation portion into the projection,
wherein the cross passage extends transversely with respect to the longitudinal direction and connects the through passage with the end passage, and
wherein the end passage opens into the coolant outlet.

12. The cutting tool as claimed in claim 11,
wherein the cross passage of the coolant guiding channel is arranged perpendicularly to the through passage and the end passage of the coolant guiding channel.

13. The cutting tool as claimed in claim 11,
wherein the cross passage of the coolant guiding channel has a first and a second end,
wherein the first end opens into the through passage at a right angle, and
wherein the second end opens into the end passage at a right angle.

14. The cutting tool as claimed in claim 11,
wherein at least a part of the end passage is arranged within the first clamping finger, and
wherein at least a part of the through passage is arranged within continuation portion.

15. The cutting tool as claimed in claim 11,
wherein the beam part has a width measured perpendicularly to the longitudinal direction,
wherein and the continuation portion has a thickness measured perpendicularly to the longitudinal direction, and
wherein the width of the beam part is larger than the thickness of the continuation portion.

16. The cutting tool as claimed in claim 11,
wherein the coolant outlet is arranged on a front face of the first clamping finger, and
wherein the front face extends transversely with respect to the longitudinal direction.

17. The cutting tool as claimed in claim 11,
wherein the continuation portion comprises a web being a flat element which is longer than it is wide.

18. The cutting tool as claimed in claim 11,
wherein the continuation portion consists of the same materials as the beam part of the holder.

19. The cutting tool as claimed in claim 11,
wherein the continuation portion is formed integrally with the beam part of the holder.

20. The cutting tool as claimed in claim 11,
wherein the through passage is guided past the rear end of the clamping gap close to said the rear end of the clamping gap.

\* \* \* \* \*